(12) United States Patent
Hagen et al.

(10) Patent No.: US 11,746,910 B2
(45) Date of Patent: Sep. 5, 2023

(54) PLUG INTEGRATED STAGED VALVE TRIM ASSEMBLY AND FLUID CONTROL VALVE COMPRISING SAME

(71) Applicant: FISHER CONTROLS INTERNATIONAL LLC, Marshalltown, IA (US)

(72) Inventors: Cory J. Hagen, Johnston, IA (US); Katherine N. Bartels, Ames, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 36 days.

(21) Appl. No.: 17/365,405

(22) Filed: Jul. 1, 2021

(65) Prior Publication Data

US 2022/0003326 A1    Jan. 6, 2022

Related U.S. Application Data

(60) Provisional application No. 63/047,340, filed on Jul. 2, 2020.

(51) Int. Cl.
| | | |
|---|---|---|
| *F16K 3/26* | (2006.01) | |
| *F16K 3/24* | (2006.01) | |
| *F16K 39/04* | (2006.01) | |
| *F16K 3/314* | (2006.01) | |
| *F16K 3/30* | (2006.01) | |
| *F16K 27/04* | (2006.01) | |
| *F16K 27/08* | (2006.01) | |

(52) U.S. Cl.
CPC .............. *F16K 3/262* (2013.01); *F16K 3/246* (2013.01); *F16K 3/267* (2013.01); *F16K 3/30* (2013.01); *F16K 3/314* (2013.01); *F16K 27/041* (2013.01); *F16K 27/08* (2013.01); *F16K 39/04* (2013.01)

(58) Field of Classification Search
CPC .......... F16K 3/262; F16K 3/246; F16K 39/04; F16K 3/267; F16K 3/314; F16K 3/30; F16K 27/041; F16K 27/08
USPC .................................. 251/127, 210, 282, 325
See application file for complete search history.

(56) References Cited

U.S. PATENT DOCUMENTS

| | | | | |
|---|---|---|---|---|
| 495,575 | A * | 4/1893 | Apel | F16K 3/26 137/625.26 |
| 671,717 | A * | 4/1901 | Blake | F16K 21/04 251/237 |
| 5,133,383 | A * | 7/1992 | King | F16K 47/04 251/282 |
| 5,439,030 | A * | 8/1995 | Cazcarra Pallaruelo | F16K 47/04 251/282 |
| 5,615,708 | A * | 4/1997 | Barron | F16K 47/04 137/625.3 |
| 6,918,409 | B1 * | 7/2005 | Parker | F02M 63/0042 251/325 |

\* cited by examiner

*Primary Examiner* — John Bastianelli
(74) *Attorney, Agent, or Firm* — MARSHALL, GERSTEIN & BORUN LLP

(57) ABSTRACT

A fluid valve includes a valve body having a fluid inlet and a fluid outlet. A fluid passageway connects the fluid inlet and the fluid outlet. A trim assembly is located within the fluid passageway, the trim assembly controlling fluid flow through the fluid passageway. The trim assembly includes valve plug having an integrated staged pressure recovery.

5 Claims, 2 Drawing Sheets

PLUG INTEGRATED STAGED VALVE TRIM ASSEMBLY AND FLUID CONTROL VALVE COMPRISING SAME

FIELD OF THE DISCLOSURE

The disclosure relates generally to fluid valves and, more particularly, to trim assemblies that include a plug integrated staged valve trim assembly.

BACKGROUND

Control valves are commonly used in process plants to control the flow of a fluid (e.g., a gas, a liquid, etc.) or any other substance through pipes and/or vessels to which they are connected. A control valve typically includes an inlet and an outlet, and a fluid control element or member (e.g., a valve gate, a piston, a valve plug, a control member, etc.) that operates to control fluid flow through a flow path that fluidly couples the inlet to the outlet. The fluid control member is typically coupled to a valve bonnet that is mechanically coupled (e.g., bolted, clamped, threaded into, etc.) to a valve body. Typically, the control member is configured to engage a sealing structure (e.g., a valve seat) that encompasses the flow path through the valve.

Generally speaking, the control elements (including the fluid control member, the seat, and a cage if one exists) are known as "valve trim" or "valve trim assembly" in the art. In some cases it may be desirable to characterize fluid as it flows through the valve, for example, to reduce pressure. In these cases, a valve trim assembly may be used that includes a cage with one or more openings formed in a wall of the cage. The openings may be sized and shaped to characterize fluid flow as the fluid flows through the openings in the cage, for example by decreasing pressure as the fluid moves through the valve trim. This characterization or pressure reducing process may generate unwanted noise. Additionally, multi-stage cages are difficult and expensive to manufacture and they take more internal room due to the radial stages in the cage wall.

SUMMARY

In accordance with a first exemplary aspect, a fluid valve includes a valve body having a fluid inlet and a fluid outlet. A fluid passageway connects the fluid inlet and the fluid outlet. A trim assembly is located within the fluid passageway, the trim assembly controlling fluid flow through the fluid passageway. The trim assembly includes valve plug having an integrated staged pressure recovery.

In accordance with a second exemplary aspect, a valve plug for a fluid control valve includes an integrated staged pressure recovery.

In further accordance with any one or more of the foregoing first and second aspects, a fluid valve or a valve plug may further include any one or more of the following preferred forms.

In one preferred form, the valve plug includes a first pressure recovery stage.

In another preferred form, the valve plug includes a second pressure recovery stage.

In yet another preferred form, the valve plug includes a hollow central chamber.

In yet another preferred form, the valve plug includes a first plurality of openings.

In yet another preferred form, the valve plug includes a second plurality of openings.

In yet another preferred form, a plug guide is included.

In yet another preferred form, an independent seat is included.

In yet another preferred form, the fluid passageway has a flow-up orientation.

In yet another preferred form, a protrusion is included in the fluid passageway downstream of the seat.

In yet another preferred form, a balance passageway is included.

In yet another preferred form, the balance passageway is formed in a plug guide.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, while one example has been described throughout this specification, other examples are envisioned that fall within the scope of this disclosure. Any features from any example may be included with, a replacement for, or otherwise combined with other features from other examples.

The examples described herein relate to fluid valves having a plug integrated staged trim assembly. Generally, staged trim assemblies are sometimes employed to facilitate out gassing in the oil and gas industry. The examples described herein reduce manufacturing costs while providing a compact plug integrated staged trim assembly with fewer parts and more simple assembly than traditional staged valve trim assemblies. Moreover, the described examples optionally include a flow-up orientation and a relatively short trim package that allows use of a large flow cavity to be used as a trim outlet, which reduces erosion and allows for fluid expansion. An optional built-in deadband may protect the valve seat. Furthermore, the example valve trim assemblies described herein optionally employ an independent seat ring and/or a hung cage, which compensate for differing thermal expansion rates of components. Finally, the described examples lend easily to cast body manufacturing that is a lower cost alternative.

Figure 1:
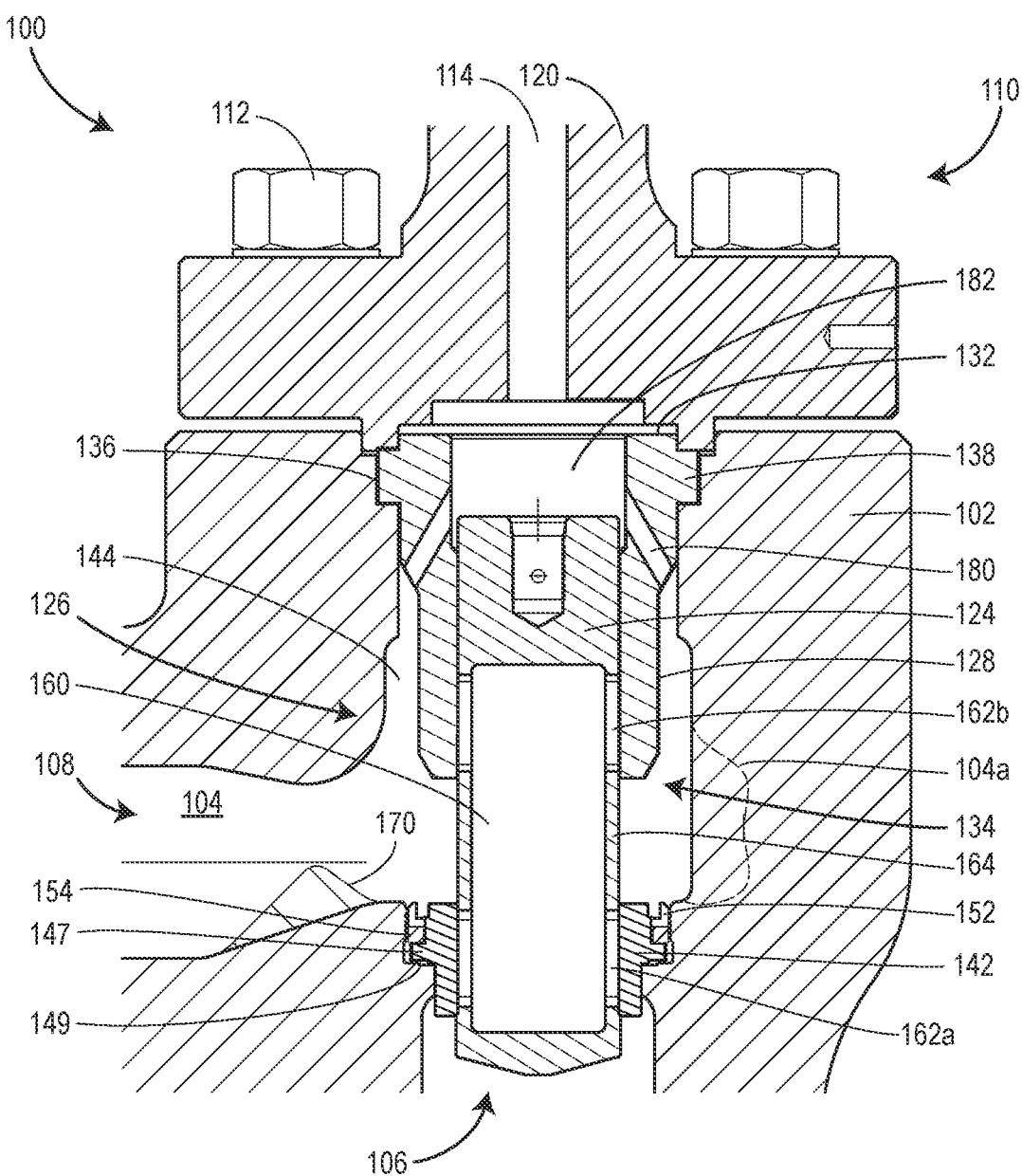
FIG. 1 illustrates a cross-sectional view of a fluid control valve constructed in accordance with the teachings of the disclosure, the valve plug being in a closed position.
Figure 2:
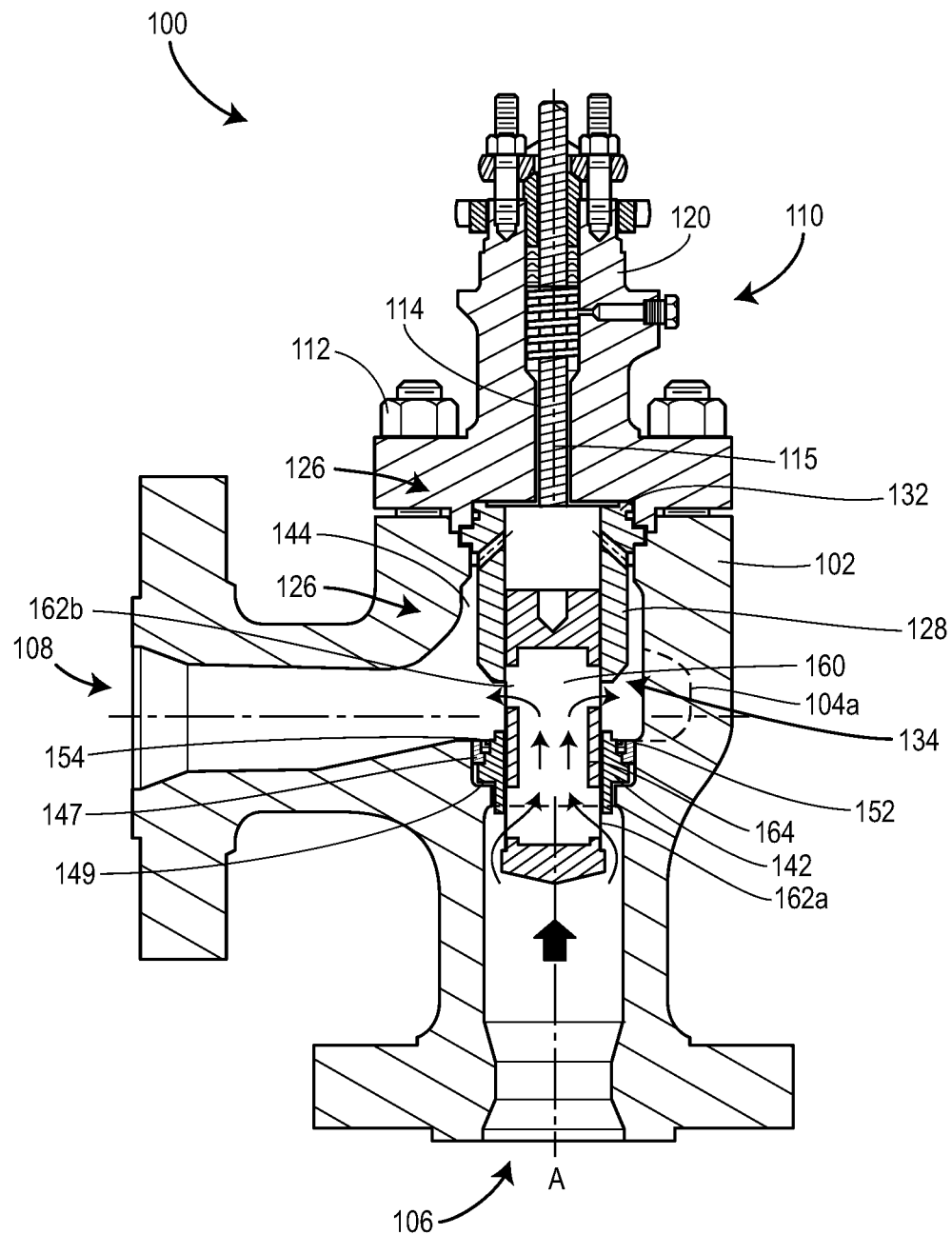
FIG. 2 illustrates a cross-sectional view of the fluid control valve of the fluid control valve of FIG. 1, the valve plug being in a partially open position.

FIG. 1 illustrates an example fluid valve 100 that has a valve body 102 including a fluid flow passageway 104 between an inlet 106 and an outlet 108. A bonnet 110 is coupled to the valve body 102 via a plurality of fasteners 112 and the bonnet 110 includes a bonnet body 120 having a bore 114 to receive a stem 115 (FIG. 2). An end of the stem extends from a bonnet body 120 and is operatively coupled to an actuator (not shown), and an opposite end of the stem is coupled to a control member 124 (e.g., a valve plug).

As used herein, a plug staged valve trim assembly 126 of the example fluid valve 100 includes a plug guide 128, the plug 124, and a seat 142. In the embodiments illustrated in the figures, the plug guide 128 and the seat 142 are illustrated as separate and distinct structural elements. In other embodiments, the seat 142 and the plug guide 128 may be connected by a cage (not shown) and/or may be formed as a single unitary structural element that is clamped between the valve body 102 and the bonnet body 120.

Generally, an end 132 of the plug guide 128 is positioned at least partially within the valve body 102 and adjacent the bonnet 110 (e.g., the end 132 of the plug guide 128 is clamped between the valve body 102 and the bonnet body 120) and an opposing end 134 of the plug guide 128 extends into the passageway 104. The plug guide 128 aligns and guides the valve plug 124 as the valve plug 124 reciprocates within the valve body 102 between open and closed positions. The plug guide 128 is positioned within the valve body 102 such that opposing steps or shoulders 138 engage and/or interlock with corresponding ledges 136 in the valve body 102 to secure the plug guide 128 at least partially within an aperture 144 of the valve body 102. Such an approach eliminates the need for a plurality of fasteners to secure the plug guide 128 within the valve body 102 and, thus, any distortion that may be caused when coupling a plug guide 128 to a valve body 102.

Similarly, the seat 142 is positioned within the valve body 102 such that opposing steps or shoulders 147 engage and/or interlock with corresponding ledges 149 in the valve body. This approach also eliminates the need for a plurality of fasteners to secure the seat 142, the seat 142 may be more easily removed from and/or assembled within the example fluid valve 100 during, for example, routine maintenance. Although, some larger diameter IST's may require the use of fasteners. The seat 142 may be maintained in position with a threaded retainer ring 152. An optional seal 154, such as an o-ring, may be located between the seat 142, the retainer ring 152, and the valve body 102 to prevent fluid leakage or seepage when the plug 124 is in a closed configuration, such as that illustrated in FIG. 1.

The trim assembly 126 controls fluid flow through the fluid passageway 104 by an interaction between the control member 124 and the seat 142. The trim assembly 126, in the illustrated embodiment, includes the plug guide 128 and the control member 124. In some embodiments, the trim assembly 126 may also include the seat 142 and/or a cage (not shown). The plug guide 128 is located downstream of the seat 142. The control valve 100 illustrated in FIGS. 1 and 2 has a flow-up orientation, where fluid enters the inlet 106 from a bottom of the valve body 102, and exits the outlet 108, which is above the inlet 106. Furthermore, passageway 104 turns about 90 degrees between the inlet 106 and the outlet 108, as illustrated by an inlet axis A and an outlet axis B.

In the illustrated embodiment, the valve plug 124 includes a hollow central chamber 160 and a first and second plurality of openings 162a, 162b in a wall 164 of the valve plug 124. The first plurality of openings 162a acts as a first pressure recovery stage (or an inlet pressure recovery stage) and second plurality of openings 162b acts as a second pressure recovery stage (or an outlet pressure recovery stage). Thus, the valve plug 124 includes an integrated staged (e.g., two-stage) pressure recovery. Because the fluid enters the chamber 160 through the first plurality of openings 162a, the pressure recovers as the fluid flows into the larger volume of the chamber 160 and further does not have any obstacles to impinge upon. Similarly, as the fluid exits the chamber 160 through the second plurality of openings 162b, the fluid flows into a larger part of the passageway 104, which allows pressure to further recover due to the larger volume of the passageway 104 and because there are no obstacles for the fluid to impinge upon.

The passageway 104 may include a larger carved out portion 104a to further enlarge the volume of the passageway 104 where the fluid flows out of the chamber 160, thereby enhancing pressure recovery.

In some embodiments, the outlet side of the passageway 104 may include a protrusion 170 (shown in FIG. 1) that creates a flow ramp/deflector that increases the flow efficiency.

In some embodiments, a distance from a bottom of the seat 142 to a bottom of the plug guide 128 may approximately equal the distance from a bottom of the first plurality of openings 162a to a bottom of the second plurality of openings 162b. In this way, the amount of area open for the fluid to flow into the cavity 160 and out of the cavity 160 remains approximately equal as the valve plug 124 is pushed downward during opening, or pulled upward during closing. This prevents pressure build up and/or dead flow areas within the cavity 160.

In yet other embodiments, the trim assembly 126 may form a balanced trim assembly by drilling vertical holes through the plug wall between the openings. In other embodiments, optional equalization passageways 180 may allow pressure on top of the plug to equalize with downstream pressure.

Generally, the plug integrated staged trim assemblies described herein include openings, cavities, channels, or chambers within a valve plug. The cavities, channels, or chambers are fluidly connected to the downstream side of the valve plug. The cavities, channels, or chambers enhance pressure recovery and/or, reduce cavitation, noise, and erosion.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A fluid valve comprising:
a valve body having a fluid inlet and a fluid outlet;
a fluid passageway connecting the fluid inlet and the fluid outlet;
a trim assembly located within the fluid passageway, the trim assembly controlling fluid flow through the fluid passageway, the trim assembly including a valve plug having integrated staged pressure recovery including a first pressure recovery stage and a second pressure recovery stage;
a plug guide mounted to the valve body for guiding the plug, the plug guide extending into and surrounded by a portion of the fluid passageway;
wherein the valve plug includes a hollow central chamber forming a portion of the fluid passageway, a wall surrounding the hollow central chamber, and a first and a second plurality of openings through the wall, the first and second pluralities of openings separated by a portion of the wall;
wherein the first plurality of openings form the first pressure recovery stage as fluid enters the hollow central chamber through the first plurality of openings, and the second plurality of openings form the second pressure recover stage as fluid exits the hollow central chamber through the second plurality of openings.

2. The fluid control valve of claim 1, wherein the plug guide includes a balance passageway providing communication between the fluid passageway and a top of the valve plug, and including an independent seat, wherein when the valve is in a closed position the first plurality of openings is surrounded by the seat and the second plurality of openings is surrounded by the plug guide thereby preventing fluid flow through the valve, and further wherein when the valve is in an open position the first plurality of openings are at least partially clear of the seat and the second plurality of openings are at least partially clear of the plug guide thereby permitting fluid flow through the valve.

3. The fluid control valve of claim 2, further comprising a protrusion in the fluid passageway downstream of the seat.

4. The fluid control valve of claim 1 wherein the fluid passageway has a flow-up orientation.

5. A fluid valve comprising:
- a valve body having a fluid inlet and a fluid outlet;
- a fluid passageway connecting the fluid inlet and the fluid outlet;
- a trim assembly located within the fluid passageway, the trim assembly controlling fluid flow through the fluid passageway, the trim assembly including a valve plug having integrated staged pressure recovery including a first pressure recovery stage and a second pressure recovery stage;
- wherein the valve plug includes a hollow central chamber forming a portion of the fluid passageway, a wall surrounding the hollow central chamber, and a first and a second plurality of openings through the wall, the first and second pluralities of openings separated by a portion of the wall;
- wherein the first plurality of openings form the first pressure recovery stage as fluid enters the hollow central chamber through the first plurality of openings, and the second plurality of openings form the second pressure recover stage as fluid exits the hollow central chamber through the second plurality of openings;
- a plug guide extending into and surrounded by a portion of the fluid passageway, and including an independent seat, wherein when the valve is in a closed position the first plurality of openings is surrounded by and sealed by the seat and the second plurality of openings is surrounded by the plug guide, thereby preventing fluid flow through the valve;
- wherein when the valve is in an open position the first plurality of openings are at least partially clear of the seat and the second plurality of openings are at least partially clear of the plug guide thereby permitting fluid flow through the valve; and
- further comprising a balance passageway formed in the plug guide and providing communication between the passageway and a top of the valve plug.

* * * * *